(12) United States Patent
Grummon

(10) Patent No.: US 6,460,054 B1
(45) Date of Patent: Oct. 1, 2002

(54) SYSTEM AND METHOD FOR DATA STORAGE ARCHIVE BIT UPDATE AFTER SNAPSHOT BACKUP

(75) Inventor: Jeffrey L. Grummon, Milford, NH (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/464,250

(22) Filed: Dec. 16, 1999

(51) Int. Cl.$^7$ ............................................... G06F 17/30
(52) U.S. Cl. ........................... 707/204; 707/161; 714/2; 711/162; 711/167
(58) Field of Search ................................. 707/204, 161; 711/162, 167; 714/2

(56) References Cited

U.S. PATENT DOCUMENTS

| | | | |
|---|---|---|---|
| 4,654,819 A | 3/1987 | Stiffler et al. | 364/900 |
| 5,535,381 A | 7/1996 | Kopper | 395/600 |
| 5,758,067 A | 5/1998 | Makinen et al. | 395/185.07 |
| 5,794,254 A | 8/1998 | McClain | 707/204 |
| 5,907,672 A * | 5/1999 | Matze et al. | 714/8 |
| 6,061,770 A * | 5/2000 | Franklin | 711/162 |
| 6,101,585 A * | 8/2000 | Brown et al. | 711/162 |
| 6,219,693 B1 * | 4/2001 | Napolitano et al. | 709/203 |
| 6,301,605 B1 * | 10/2001 | Napolitano et al. | 709/201 |
| 6,341,341 B1 * | 1/2002 | Grummon et al. | 711/162 |

OTHER PUBLICATIONS

U.S. patent application Ser. No. 09/465,354, Jeffrey L. Grummon et al., filed Dec. 6, 1999.

* cited by examiner

*Primary Examiner*—Charles L. Rones
(74) *Attorney, Agent, or Firm*—Cesari and McKenna, LLP

(57) ABSTRACT

A system and method for updating file archive bits in a data storage arrangement that performs snapshot backup operations is provided. The snapshot container is a read-write container that can receive archive bit backup write data from the file system and associated file system. Snapshot container files in which archive bits have been cleared, indicating a backup, are checked. These files' counterparts in the snapshotted container are located. Where the snapshotted files have had archive bits cleared, they are passed over. Where snapshotted files have set archive bits, the file data parameters for respective snapshot and snapshotted files are compared. If the file data parameters therebetween are the same, then the respective snapshotted file archive bit is cleared confirming backup status. Where the file data parameters differ, the set archive bit for the snapshotted file is retained, indicating un-backed-up current version in the snapshotted container.

10 Claims, 6 Drawing Sheets

SYSTEM AND METHOD FOR DATA STORAGE ARCHIVE BIT UPDATE AFTER SNAPSHOT BACKUP

FIELD OF THE INVENTION

The invention relates generally to the field of computer systems and more particularly provides a system and method for reconfiguring storage devices of a computer system into logical units of storage space on one or more on-line disk drives, typically while the system is in real-time operation.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The applications address those storage devices in terms of the names of files, which contain the information to be sent to or retrieved from them. A file system, which is a component of the operating system, translates the file names into logical addresses in the storage subsystem. The file system forwards the I/O requests to an I/O subsystem, which, in turn, converts the logical addresses into physical locations in the storage devices and commands the latter devices to engage in the requested storage or retrieval operations.

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. In its basic configuration, a stripe set is also known as a "RAID 0" configuration. A mirror set is composed of volumes on multiple disks, whereby a volume on one disk is a duplicate copy of an equal sized volume on another disk in order to provide data redundancy. A basic configuration for a mirror set is known as "RAID 1." There is often a desire to increase data reliability in a stripe set by using parity distributed across storage blocks with respect to each stripe. Where such parity is provided to the stripe set, the configuration is known as "RAID 5." In an even more complex implementation, where stripe sets are mirrored on a plurality of containers—and parity is distributed across the stripes, the resulting configuration is known as "RAID 10." Generally speaking, all configurations of the RAID implementation (RAID 0–10) provide a collection of partitions, where each partition is composed of space from one disk in order to support data redundancy.

According to a prior system, the I/O subsystem configures the containers through a software entity called a "container manager." Essentially the container manager sets up a mapping structure to efficiently map logical addresses received from the file system to physical addresses on storage devices. The I/O subsystem also includes a software driver for each type of container configuration on the system. These drivers use the mapping structure to derive the physical addresses, which they then pass to the prospective storage devices for storage and retrieval operations.

Specifically, when the computer system is initially organized, the I/O subsystem's container manager configures the containers and maintains the configuration tables in a container layer of the I/O subsystem. In accordance with a co-pending related U.S. Pat. No. 6,219,693, issued on Apr. 17, 2001, entitled, File Array Storage Architecture by Richard Napolitano et al., the container layer of he I/O subsystem comprises a Device Switch Table, a Container Array, and a Partition Table. The teachings of this application are expressly incorporated herein by reference. The Device Switch table consists of entries, each of which ordinarily points to the entry point of a container driver that performs I/O operations on a particular type of container. The Container Array is a table of entries, each of which ordinarily points to data structures used by a container driver. There is a fixed one-to-one relationship between the Device Switch Table and the Container Array. The Partition Table contains partition structures copied from disk drives for each container on the system. Each Partition Table entry points to one physical disk drive and allows the container driver to access physical location in the on-line storage devices.

When a software process issues an I/O request, the file system accepts the file-oriented I/O request and translates it into an I/O request bound for a particular device. The file system sends the I/O request which includes, inter alia, a block number for the first block of data requested by the application and also a pointer to a Device Switch Table entry which points to a container driver for the container where the requested data is stored. The container driver accesses the Container Array entry for pointers to the data structures used in that container and to Partition Table entries for that container. Based on the information in the data structures, the container driver also accesses Partition Table entries to obtain the starting physical locations of the container on the storage devices. Based on the structures pointed to by the Container Array entry and partition structures in the Partition Table, the container driver sends the I/O request to the appropriate disk drivers for access to the disk drives.

In prior systems, the containers are configured during the initial computer setup and can not be reconfigured during I/O processing without corrupting currently processing I/O requests. As storage needs on a computer system change, the system administrators may need to reconfigure containers to add disks to them or remove disks from them, partition disks drives to form new containers, and/or increase the size of existing containers. If containers are reconfigured during I/O processing in the I/O subsystem, the reconfiguration may corrupt or erase the currently processing I/O requests. However, shutting down the system to reconfigure containers may be unacceptable for businesses that require high availability, i.e., twenty-four hours/seven days a week on-line activity.

One aspect of the system described herein is to provide a method of routing processing I/O requests in the I/O subsystem to a different container than previously pointed to by the file system. On-line storage devices are configured from on one or more disks into logical units of storage space referred to herein as "containers." Containers are created and maintained by a software entity called the "container manager." Each type of container on the system has an associated driver, which processes system requests on that type of container. After a complete backup operation, the backup program verifies the backed up files to make sure that the files on the secondary storage device (usually a tape) were correctly backed up. One problem with the backup process is that files may change during the backup operation.

To avoid backing up files modified during the backup process and to enable applications to access files during the backup operation, the container manager periodically (e.g. once a day) performs a procedure that takes a "snapshot" or copy of each read-write container whereby, the container manager creates a read-only container which looks like a copy of the data in the read-write container at a particular instant in time. Thereafter, the container manager performs a "copy-on-write" procedure where an unmodified copy of data in the read-write container is copied to a read-only backup container every time there is a request to modify data in the read-write container. The container manager uses the copy-on-write method to maintain the snapshot and to enable backup processes to access and back up an unchanging, read-only copy of the on-line data at the instant the snapshot was created. This procedure is described in detail in related co-pending U.S. Pat. No. 6,061,770, issued on May 9, 2000, entitled Copy-on-Write with Compaction by Chris Franklin, the teachings of which are also expressly incorporated herein by reference.

During the backup procedure, the container manager creates a "snapshot" container, a "snapshotted" container and a "backing store" container. After the container manager takes the snapshot, the snapshotted container driver processes all input/output (I/O) requests, to store data in or retrieve data from a read-write container. The snapshotted container driver processes all I/O requests to retrieve data from the read-write container by forwarding them directly to the read-write container driver. However for all I/O requests to modify data in a read-write container, the container manager first determines whether the requested block of data has been modified since the time of the snapshot. If the block has not been modified, the container manager copies the data to the backing store container and then sets an associated bit-map flag in a modified-bit-map table. The modified-bit-map table contains a bit-map with each bit representing one block of data in the read-write container. After setting the modified-bit-map flag, the snapshotted container driver forwards the I/O storage request to the read-write container driver.

When the backup process begins execution, it invokes I/O retrieval requests from the snapshot container. A file system, which is a component of the operating system translates the file-oriented I/O request into a logical address and forwards the request to a snapshot container driver. The snapshot container driver checks the associated bit-map in the modified-bit-map table for the requested block of data. If the bit-map is set, the snapshot container driver forwards the request to the backing store container driver to retrieve the unmodified copy of that block from the backing store container. The backing store container driver then processes the backup process retrieval request. If the bit-map is not set, this means that the block has not been modified since the snapshot was created. The snapshot container driver forwards the request to the read-write container driver to retrieve a copy of that block of data from the read-write container. Upon retrieving the file from the backing store container or the read-write container, the backup process backs it up. After a complete backup operation, the container manager deletes the snapshotted container, the snapshot container, the backing store container, and the modified-bit-map table, and thereafter, forwards all I/O requests directly to the read-write container driver.

Many computer systems currently employ the popular Windows® NT operating system, available from Microsoft of Redmond, Wash., as the framework for the running of resident applications and handling files. The particular file system associated with the NT operating system is termed the NT File System, or NTFS. NTFS, in its current version, is designed to work in conjunction with a backup facility generally configured to backup back to the original read-write storage disk. In doing so, it employs a write function to the disk for purposes of, for example marking and/or archive bit handling. The above-noted archive bits are a specific piece of data that is typically written by a backup facility to a storage disk. The archive bit associated with each file (data, text, etc.) is set and then cleared (e.g. the file is "recorded") to indicate that a backup operation has, in fact, occurred. The archive bit process is inherent to various file systems, but particularly to the NT operating system and associated NTFS.

In general, there are at least three levels of backup that may be performed. The most time-consuming and comprehensive backup is known as a Full Backup, in which every file within a given storage medium is backed-up. In a Full Backup, each file is, likewise, recorded by setting an associated archive bit.

An intermediate level of backup is termed Incremental Backup, in which files that have undergone changes within a certain period (typically, since the last Full Backup) are again backed-up and recorded A minimal level of backup is termed Differential Backup, in which file changes are backed-up, but no recording of the backed-up files is made during the process.

A file is initially stored with its archive bit set, when a backup occurs, the archive bit becomes cleared by the system, indicating that the file has been backed-up (e.g. recorded. This does not occur with a differential backup.

There is a significant disadvantage to conventional snapshot arrangements that generate a read-only snapshot container, when operating in an NT environment. Simply stated, the NTFS will not accept a disk container to which it cannot write (e.g. the read-only snapshot is unacceptable). Rather than performing the desired backup function, the NTFS, when accessing a read-only snapshot, returns an incompatible disk error message. In other words, any attempt to write to a read-only snapshot to change the archive bit setting is rejected. This makes incremental backups, between full backups (where recording is desired of change files) unavailable. The user must undertake time-consuming full-backups at certain intervals, and perform (unrecorded) differential backups therebetween. However, there is no certainty of which files have and have not been backed up between full backups according to this approach due to the lack of reliable recording.

One technique for performing incremental backup operations in the presence of a read-only snapshot is disclosed in co-pending U.S. Pat. No. 6,101,585, issued on Aug. 8, 2000, entitled Mechanism for Incremental Backup of On-Line Files, by Randall Brown, et al, the contents of which are expressly incorporated herein by reference. This technique entails the modification of the file system, which may not be practical in all circumstances.

However, a technique for creating a read-write backup without modifying the file system is disclosed in co-pending U.S. Pat. No. 6,341,341, published on Jan. 22, 2002, entitled System and Method for Disk Control with Snapshot Feature Including Read-Write Snapshot Half, by Chris Franklin et al., the teachings of which are expressly incorporated herein by reference. The described arrangement particularly enables a snapshot backup to operate in an NTFS, or similar file system, environment by establishing a read-write snapshot container. Appropriate mapping and storage is employed within the snapshot drive/container arrangement to ensure that both original read-write container information and the write data provided by the file system to the snapshot are properly mapped and maintained. This approach, therefore potentially enables the snapshot to be written-to by the file system for to, thereby, manipulate archive bit data within the snapshot and other containers associated therewith.

Accordingly, it is an object of this invention to enable the manipulation of archive bits associated with files that are backed-up in a snapshot backup arrangement of disk storage containers between full backups of the files therein. This system enables the status of files within a snapshotted container to be more accurately ascertained (e.g. changed or unchanged).

SUMMARY OF THE INVENTION

This invention overcomes the disadvantages of the prior art by providing a system and method for updating file archive bits in a data storage arrangement that performs snapshot backup operations. The snapshot container is a read-write container that can receive archive bit backup write data from the file system and associated file system. Snapshot container files, in which archive bits have been cleared, indicating a backup, are checked. These files' counterparts in the snapshotted container are located. Where the snapshotted files have had archive bits cleared, they are passed over. Where snapshotted files have set archive bits, the file data parameters for respective snapshot and snapshotted files are compared. If the file data parameters therebetween are the same, then the respective snapshotted file archive bit is cleared confirming backup status. Where the file data parameters differ, the set archive bit for the snapshotted file is retained, indicating un-backed-up current version in the snapshotted container.

The file data parameters can include file size and last access data for the file. Typically, the archive bit state does not alter the size or access data. Rather a user application so alters these parameters and is indicative of a change that may necessitate backup.

A "switch" can be provided in the user interface to the snapshot backup routine that enables the update of archive bits. Once archive bits have been updated the snapshot can be closed and further incremental or full backups can be undertaken with assurance that all snapshotted files (now returned to the original read-write container) carry the proper archive bit status.

BRIEF DESCRIPTION OF THE DRAWINGS

The foregoing and other objects and advantages of the invention will become more clear with reference to the following detailed description as illustrated by the drawings, in which.

DETAILED DESCRIPTION OF AN ILLUSTRATIVE EMBODIMENT

Figure 1:
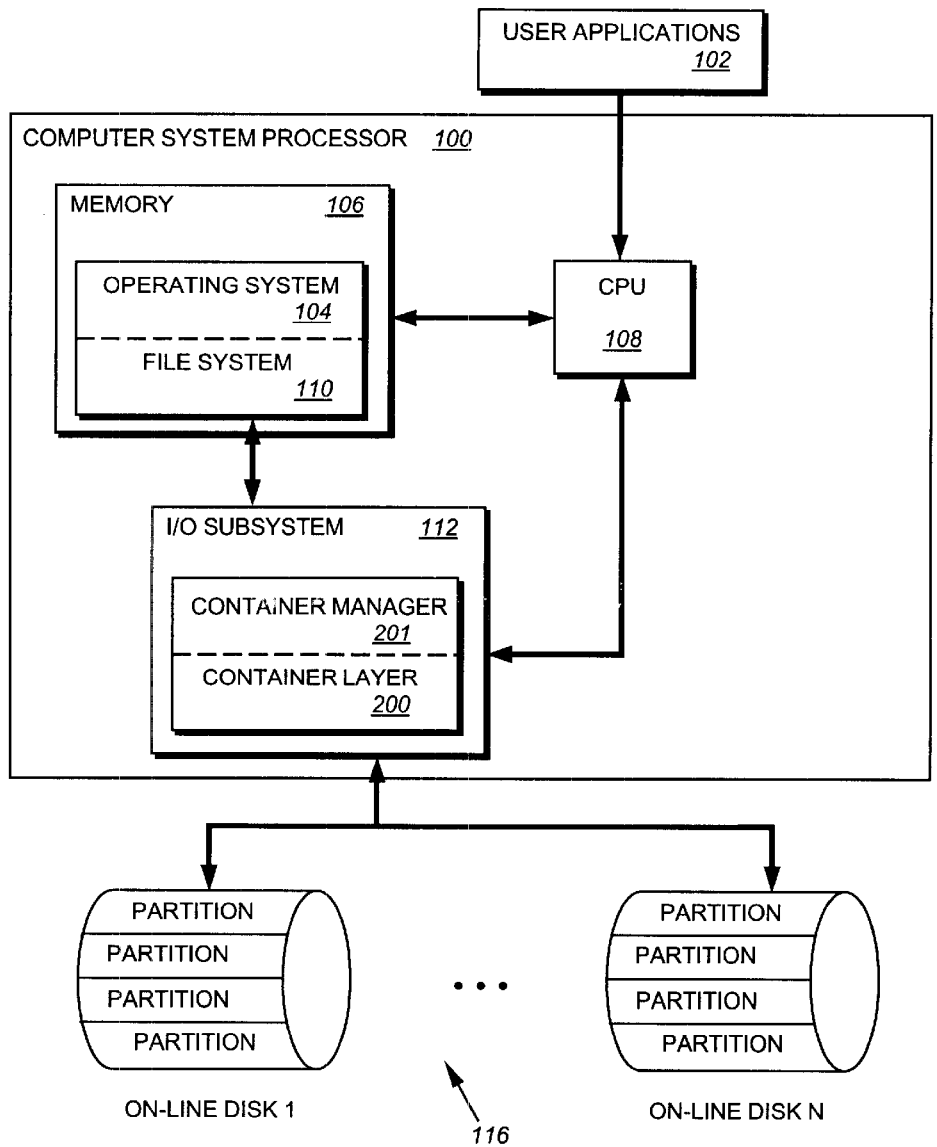
FIG. 1 is a block diagram showing a typical RAID storage implementation showing a partitioned set of disks according to the principles of this invention.

FIG. 1 is a schematic block diagram of a typical computer system that is configured to perform copy-on-write procedure in accordance with the present invention. The computer system processor 100 comprises a memory 106 and an input/output (I/O) subsystem 112 interconnected with a central processing unit (CPU) 108. The memory 106 comprises storage locations addressable by the CPU 108 and I/O subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. The I/O subsystem 112 is, in turn, connected to a set of on-line storage devices 116. These on-line storage devices 116 are partitioned into units of physical space associated with the inventive copy-on-write procedure described herein.

User applications 102 and other internal processes in the computer system invoke I/O requests from the operating system 104 by file names. A file system 110, which is a component of the operating system 104, translates the file names into logical addresses. The file system 110 forwards the I/O requests to a I/O subsystem 112 which, in turn, converts the logical addresses into physical locations in the storage devices 116 and commands the latter devices to engage in the requested storage or retrieval operations. The I/O subsystem 112 configures the partitions of the physical storage devices 116 into containers and stores container configuration tables in the container layer 200 of the I/O subsystem 112. Container configuration enables the system administrator to partition a disk drive into one or more virtual disks. A container manager 210 operates in association with the I/O subsystem 112.

Typically, backup operations are performed at the request of a computer operator. In an illustrative backup approach embodiment, the file system 202 instructs the I/O subsystem 112 to perform a conventional copy-on-write operation in response to the operator's request. This can be an operation performed automatically at the request of the operating system or another application according to alternate embodiments.

Figure 2:
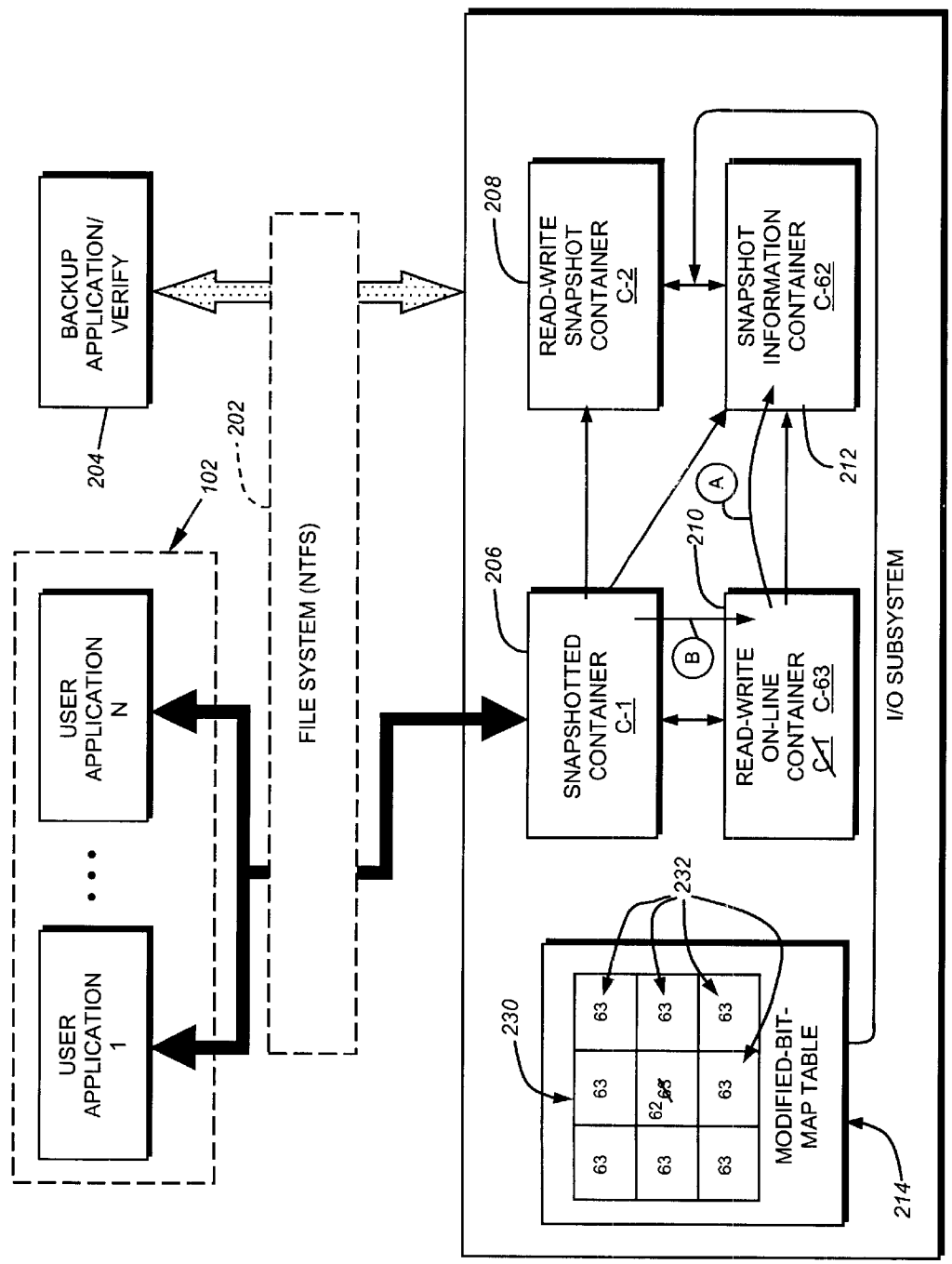
FIG. 2 is a block diagram showing the components of a copy-on-write procedure according to a snapshot backup container arrangement including a read-write snapshot container according to a preferred embodiment of this invention.

FIG. 2 shows a generalized copy-on-write procedure according to the above-referenced patent application entitled System and Method for Disk Control with Snapshot Feature Including Read-Write Snapshot Half In performing the copy-on-write procedure, the I/O subsystem 112, which reads from and writes to an original read-write container 210, now creates a snapshotted container 206, a read-write snapshot container 208 and a backing store or "backup" container, that is actually termed a snapshot information container for reasons to be described further below 212. Each container is controlled by an associated container driver that processes I/O requests for that container. For the purposes of this description the driver is assumed to be present on the container or within an associated application, or on the adapter for controlling the RAID functionalities.

Furthermore the adapter, drivers and other functionalities of this system can be implemented is as hardware, software or a combination of both. When referring to a given container herein (for simplicity), the description thereof is also deemed to include the associated driver and other required adapter functionalities.

As noted above, before the copy-on-write procedure is performed, all I/O requests for data in the read-write container 210 are forwarded directly to the driver for the read-write container 210. After the copy-on-write procedure, all I/O requests are directed to the driver for the snapshotted container 206. For the purposes of this description the original container, prior to copy-on-write, is designated as C-1 for the purposes of mapping. Following the copy-on-write, the original container 210 is now designated as a hidden container (C-63), while the system maps data directed to C-1 to the snapshotted container 206. This snapshotted container now carries the mapped designation C-1 while that designation is removed from the original read-write container 210 (C-1 being crossed out in favor of C-63). Likewise the snapshot container is known as the mapped designation C-2 while the snapshot information container 212 is identified as hidden container C-62. The backup application 204 reads information from this snapshot container 208 and such information is verified thereby.

If the request is a storage request, the system checks the modified-bit-map table 214 to determine if the read-write container's block of data was modified after the read-write snapshot container 208 was created. If the block has been modified, the modified bit is set. Therefore, the snapshotted container 206 forwards the I/O request to the read-write on-line container 210 driver. If however, the block was not modified after snapshot container 208 was created, the container manager copies the unmodified block from the read-write container 210 to the snapshot information container 212 through the snapshot information container driver 212. The container manager sets the modified-bit-map table 214 for that block, and sends the I/O request to the read-write container 210 driver for storage in the read-write container 210.

During execution, backup processes 204 forward I/O requests for files to the snapshot container 208. The read-write snapshot container 208 determines whether the file has been modified by checking the modified-bit-map table 214 for the block where the file is stored. If the block has been modified, the snapshot container driver obtains an unmodified copy of the block from the snapshot information 212 container. If the block has not been modified, the snapshot container 208 driver obtains the unmodified block from the read-write container 210. This ensures that backup processes 204 access an unchanging copy of the data from the time the snapshot is taken.

When information is written to the snapshotted container (once established) from a user application 102 (depicted applications 1–N), the original read-write container 210 is first instructed to transfer its current contents to the snapshot information container 212 so that it is preserved therein. This step is denoted by an arrow A. Thereafter, the data written to the snapshotted container 206 is transferred into appropriate locations in the original read-write container and a new real-time snapshot is provided to the read-write snapshot container 208.

As discussed above the snapshot container 208 is implemented as a read-write entity. It can receive write data from the backup application (including archive bit data to be described below). As also noted above, the backing store container herein is more properly termed a snapshot information container 212, because this container can track whether information is mapped from the original read-write container 210 or received from the backup application via the snapshot container, which is further configured to transfer write data directly to the snapshot information container 212.

In order to appropriately track information in the backing store container, the mapping functions of table 214, in association with the snapshot driver arrangement, include a bit-map 230 with a matrix (highly simplified) of block references 232 that denote whether a certain block of storage space within the container is mapped back to the read-write container (C-63), or has been modified by data from the snapshot (therefore mapped to this container, itself, as C-62) as a source thereof. This bit-map can reside within the backing store container or at another accessible location.

In general, after a user performs a full backup, and a snapshot is created, various files residing on the snapshotted container side (e.g. the snapshotted container 206 and original read-write container 210) will continue to undergo changes due to user I/O operations. Conversely, files on the snapshot container side (e.g. the snapshot container 208 and snapshot information/backup container 212) will remain relatively unchanged. Over time, the archive bit profile for files residing in the snapshot container will not match the archive bit profile for counterpart files in the snapshotted container. In general, the user accessed/snapshotted side thus contains the accurate picture of the current state of files. In the absence of an incremental backup, this would be the case until the next full backup occurs, when the snapshot is updated with all current file information.

Figure 3:
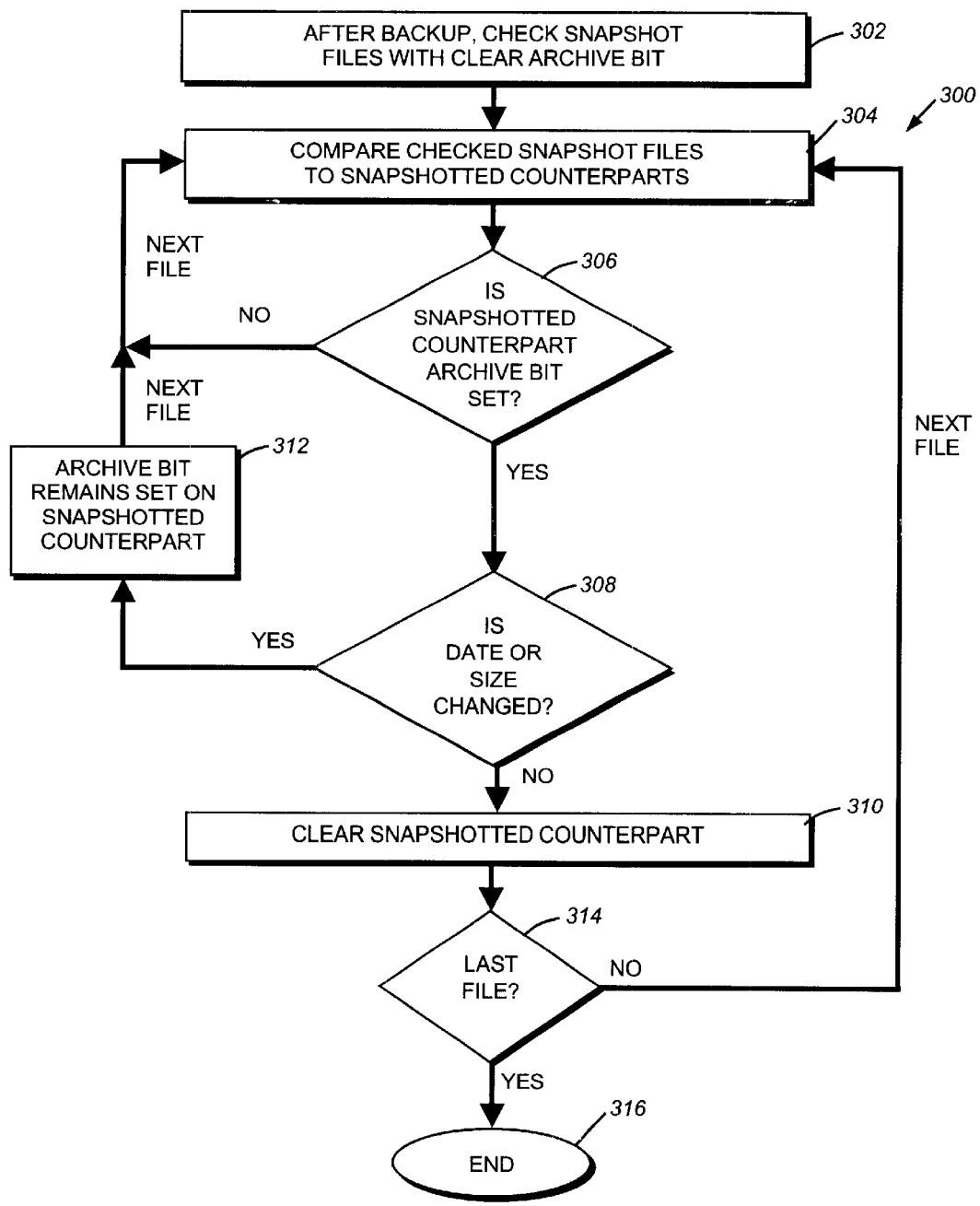
FIG. 3 is a flow diagram of an archive bit update procedure according to a preferred embodiment of this invention.
Figure 4:
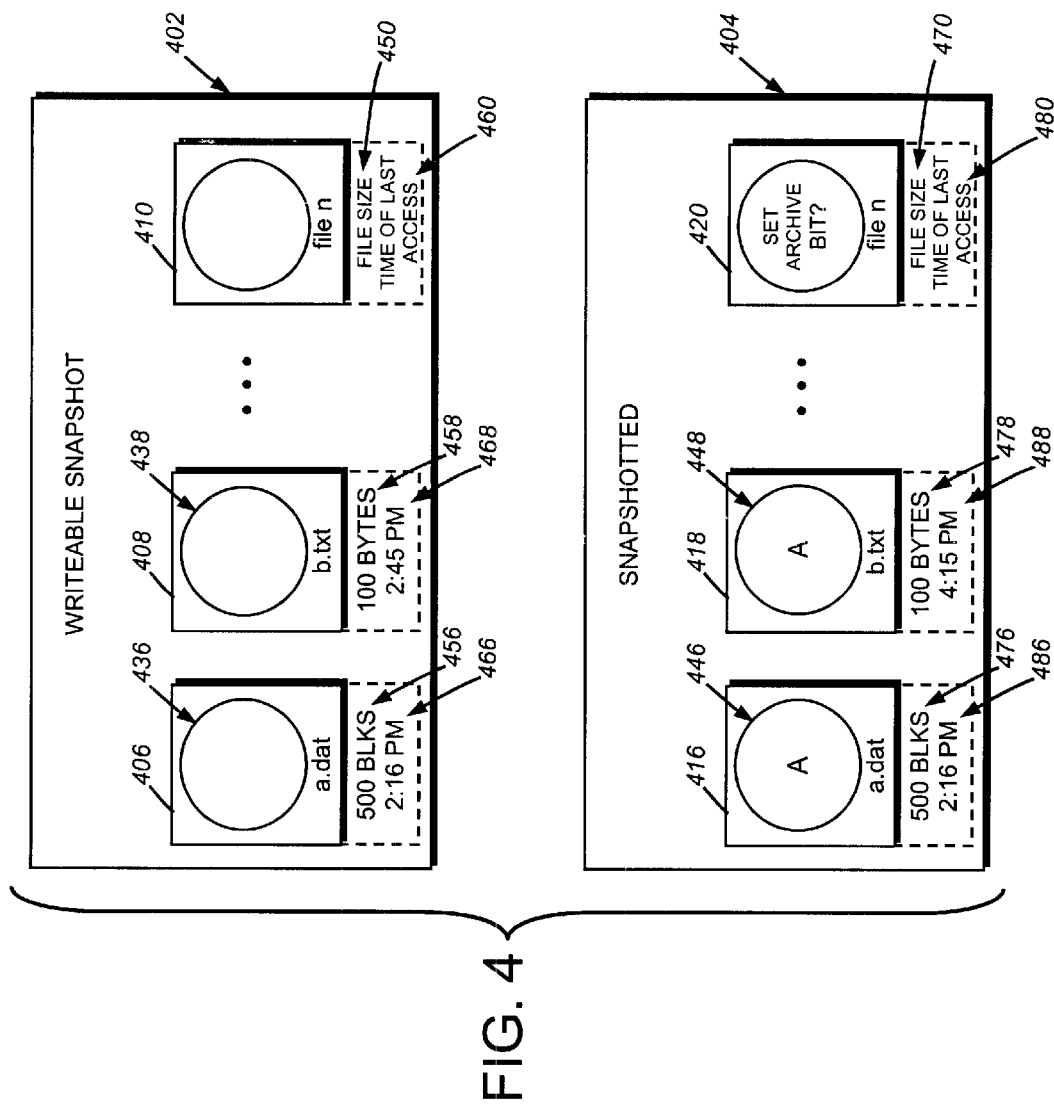
FIG. 4 is a block diagram showing exemplary files and corresponding archive bit settings prior to an update procedure according to this invention.
Figure 5:
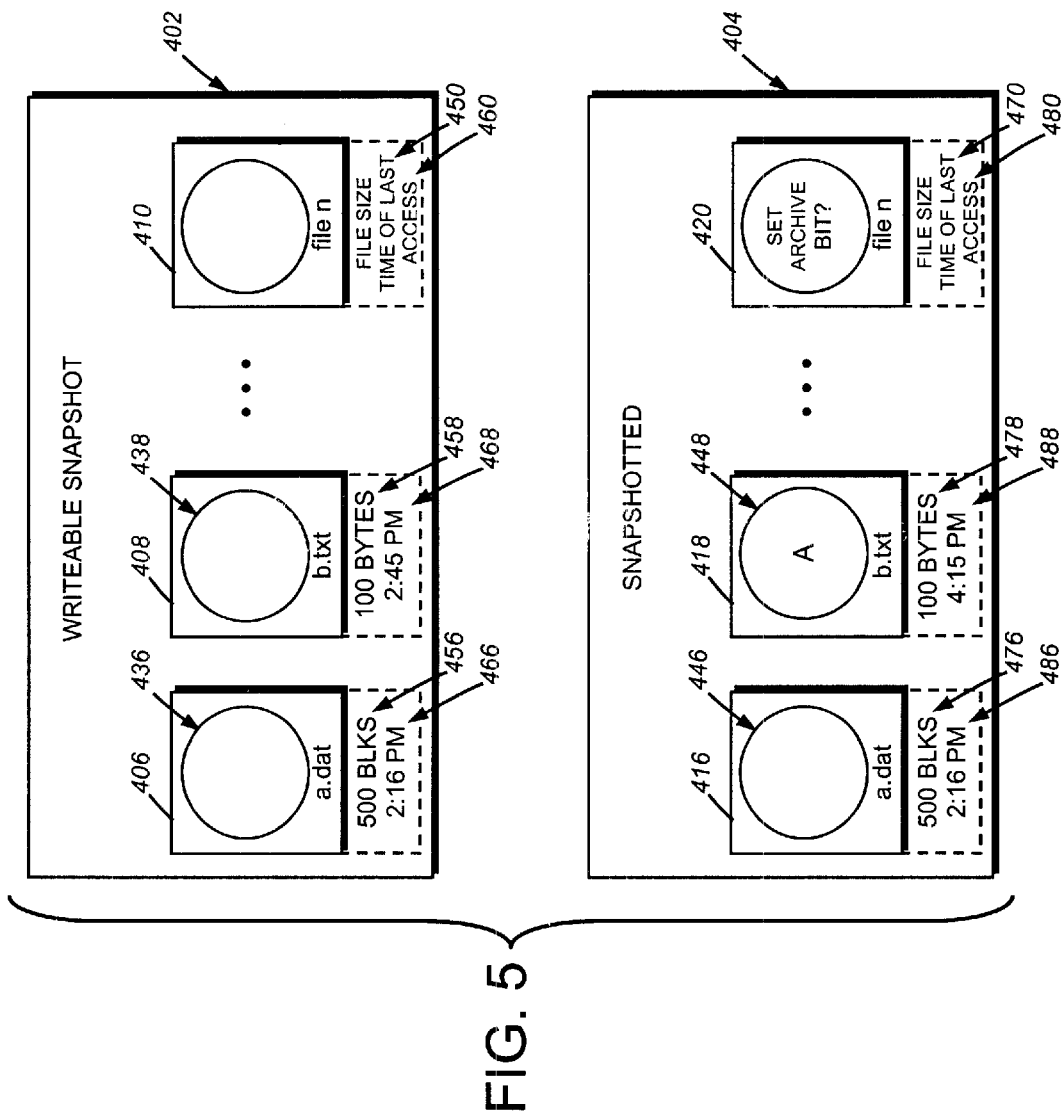
FIG. 5 is a block diagram showing exemplary files and corresponding archive bit settings subsequent to an update procedure according to this invention

Reference is now made to FIG. 3 which shows an archive bit update procedure, and also to FIGS. 4 and 5 showing exemplary files within the snapshotted and snapshot sides of the snapshot arrangement. Once a snapshot has been established, the backup facility can prompt the user to undertake a modification of archive bits according to this invention. This modification enables the archive bits in the snapshotted container to be conformed to those in the snapshot container—ensuring that the snapshotted container accurately reflects the current state of file backup.

According to the flow diagram 300, the procedure first checks any snapshot files having cleared archive bits. Files that are marked A on the snapshot side have not been archived, and, therefore will not have a changed status. Note that FIG. 4 shows an archive bit profile for the snapshot side 402 and snapshotted side 404 for a group of exemplary files for snapshot files all having cleared archive bits. For the snapshot side 402 these files are denoted a.dat 406, b.txt 408 to file n 410. For the snapshotted side these files may be different and are denoted a.dat 416, b.txt 418 to file n 420. Again, an archive bit is associated with each file, and these bits are initially set and then cleared as a file is backed up as an indicator of such a backup—based upon the file system writing a clear archive bit to the read-write snapshot. The snapshot side files 406 and 408 are, accordingly, shown having cleared archive bits (open circles 436 and 438, respectively). This correctly indicates a previous backup, and no further I/O performed to the snapshot side files. As stated, it is quite possible that the snapshotted side files 416 and 418 have had intervening operations performed to them since the last full backup. However, the archive bits for the snapshotted files 416 and 418 are still set (indicated by an A in circles 446 and 448, respectively). This may not represent the true state of current (snapshotted) file changes versus the prior snapshot.

The archive bit is not recognized as a change by the file system. In other words, whether the file archive bit is set, or cleared, the file appears otherwise unchanged. Each file is provided with at least two additional pieces of identifying data (besides the file name) that may appear changed. Particularly, the size of the file in blocks, bytes or another acceptable measure at any time is known, and time of last access. On the snapshot side (402) file n shows a generalized file size 450 and last access time 460 as part of its file information. Likewise a.dat 406 has a size 456 of 300 blocks and a last access time of 2:16. File b.txt 408 has a size 458 of 100 bytes and a last access time of 2:45. Again, only cleared-archive-bit files are identified.

Conversely, on the snapshotted side (404) the counterparts to the cleared-archive-bit files 420, 416 and 418 are now checked in accordance with procedure step 304. The size 470 and last access time 480 for file n 420 is shown. Also shown is the size 476, 478 and time 486, 488 for a.dat 416 and b.txt 418 respectively. Note that the archive bits (A) (circles 446, 448, respectively) for both a.dat 416 and b.txt 418 are set. If any files have cleared archive bits then they are passed over by the procedure according to decision block 306, since these files are already updated. Conversely if the archive bits are still set, as shown, then the procedure (according to decision block 308) checks for differences in the size or last access time.

In this case, a.dat has a size and time that are the same in both the snapshot and snapshotted versions 406, 416. Accordingly the procedure 300 directs the archive bit to be cleared (step 310). The cleared archive bit is denoted by the empty circle 446 in FIG. 5. Accordingly the snapshotted version now correctly indicates a backed-up status to the user.

Conversely, the file b.txt has a different access time 468, 488 in its snapshot and snapshotted versions 408 and 418, respectively. The snapshotted version has been accessed at a later time (4:15 PM) indicating that a change may have occurred since the last full backup (2:45 PM). As such, the procedure 300 decides to retain the archive bit (circle 448) indicating that a backup is not current. This is denoted by procedure step 312.

The procedure passes through all files as described above until the last file has been checked. The procedure (according to decision block 314) then ends (316) and informs the user that snapshot backup may be closed.

Figure 6:
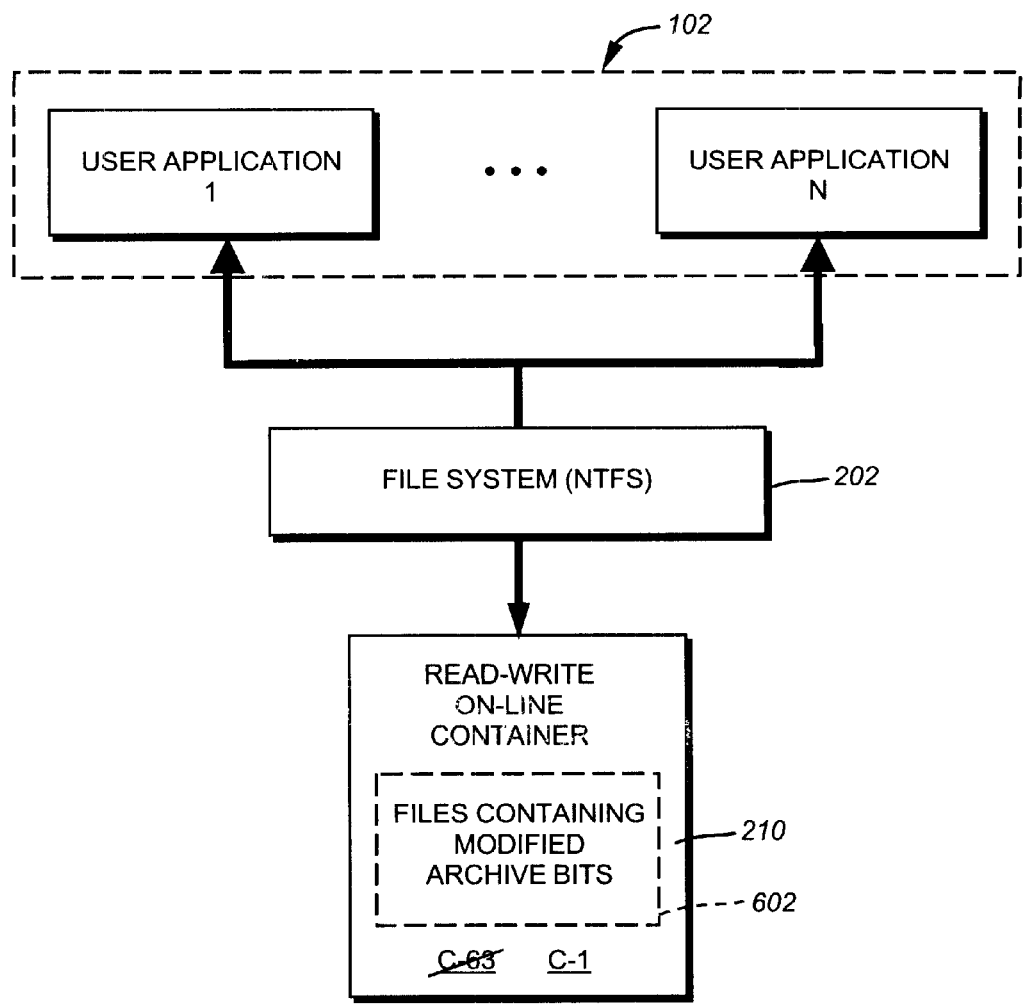
FIG. 6 is a block diagram showing a post-snapshot container arrangement with updated file backup status information according to this invention.

At this time all files within the snapshotted container have been properly updated with current backup status. The snapshotted container can then transfer its contents back into the original read-write container 210 (redesignating it as C-1 and making it visible to the user, as shown generally in FIG. 6. This container 210 now includes a full complement of files with modified archive bits representing a current update of backup status for each file therein.

Once the updated status is generated within the original read-write container as described above, further full or incremental backups can now be undertaken with assurance that the backed-up and non-backed-up files have been properly accounted for.

The foregoing is a detailed description of a preferred embodiment of the invention. Various modifications and additions can be made without departing from the spirit and scope of this invention. For example further file parameters in addition to or other than file size and last access time can be used to determine changes between snapshot and snapshotted files. Accordingly, this invention is meant to be taken only by way of example and not to otherwise limit the scope of the invention.

What is claimed is:

1. A system for updating a respective archive bit associated with each of the files residing in a read-write snapshot container of a copy-on-write arrangement with respect to a respective archive bit associated with each of the counterpart files thereto residing on a snapshotted container, the snapshotted container being associated with an original read-write container, in which the snapshotted container is substituted for the original read-write container for access by a user during the copy-on-write procedure, the system comprising:

means for identifying snapshot container files each having a respective archive bit indicating a backup thereof having occurred;

means for checking counterpart snapshotted container files with respect to the snapshot container files;

means for comparing file data parameters of the snapshot container files with respect to file data parameters of the snapshotted container files; and means, responsive to the means for comparing, for changing the respective archive bit to be an archive bit indicating a backup for files in which the file data parameters of the snapshot container file are unchanged with respect to the file data parameters of the snapshotted container files.

2. The system as set forth in claim 1 wherein the means for changing comprises means for clearing the archive bit.

3. The system as set forth in claim 2 wherein the file data parameters include a size of each respective file.

4. The system as set forth in claim 3 wherein the file data parameters include a last access date for each respective file.

5. The system as set forth in claim 1 further comprising a backup facility constructed and arranged to write archive bit change data to the snapshot container.

6. A method for updating a respective archive bit associated with each of the files residing in a read-write snapshot container of a copy-on-write arrangement with respect to a respective archive bit associated with each of the counterpart files thereto residing on a snapshotted container, the snapshotted container being associated with an original read-write container, in which the snapshotted container is substituted for the original read-write container for access by a user during the copy-on-write procedure, the system comprising:

identifying snapshot container files each having a respective archive bit indicating a backup thereof having occurred;

checking counterpart snapshotted container files with respect to the snapshot container files;

comparing file data parameters of the snapshot container files with respect to file data parameters of the snapshotted container files; and changing, in response to the step of comparing, the respective archive bit to be an archive bit indicating a backup for files in which the file data parameters of the snapshot container file are unchanged with respect to the file data parameters of the snapshotted container files.

7. The method as set forth in claim 6 wherein the step of changing comprises clearing the archive bit.

8. The method as set forth in claim 7 wherein the step of comparing the file data parameters includes comparing a size of each respective file.

9. The method as set forth in claim 8 wherein the step of comparing the file data parameters includes comparing a last access date of each respective file.

10. The method as set forth in claim 6 further comprising writing, with a backup facility, archive bit change data to the snapshot container.

* * * * *